Nov. 8, 1927.
J. INGELLS
1,648,349
DIRIGIBLE HEADLIGHT
Filed July 22 1926
3 Sheets-Sheet 1
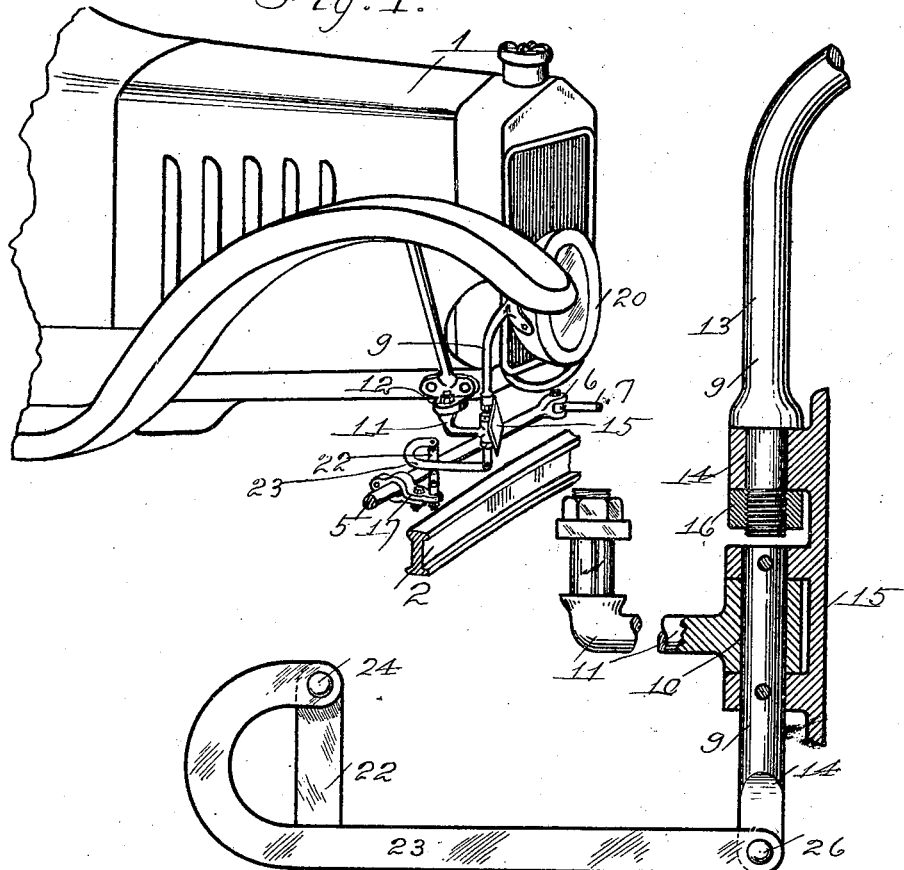
INVENTOR.
James Ingells
BY Cyrus W. Rice
ATTORNEYS.

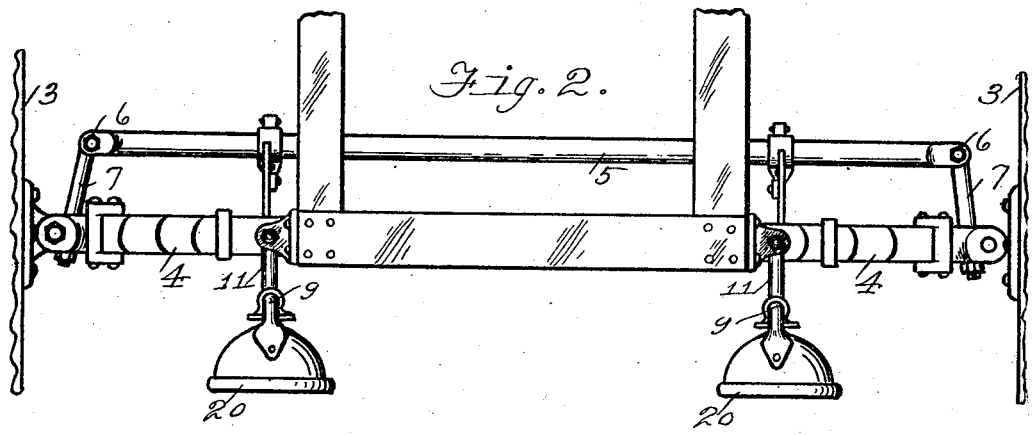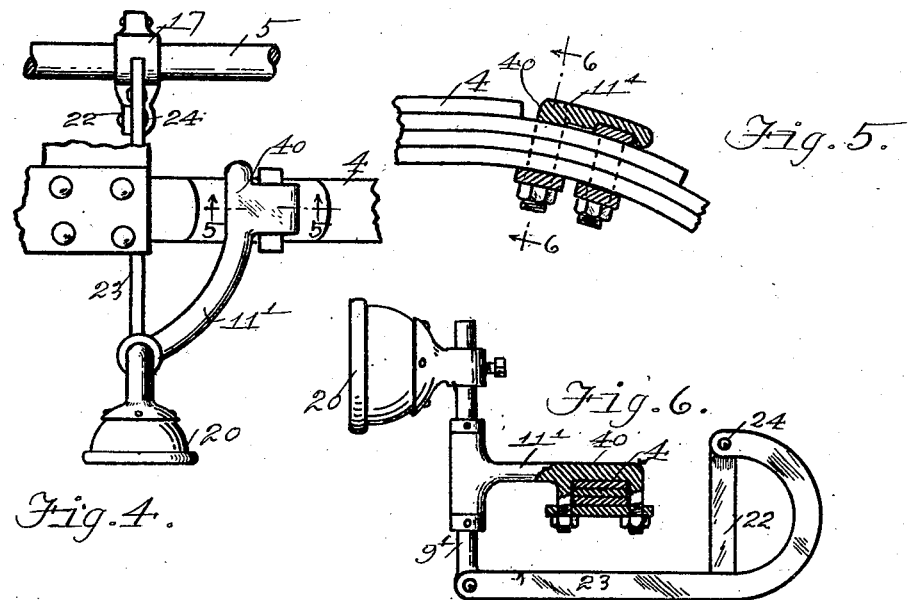

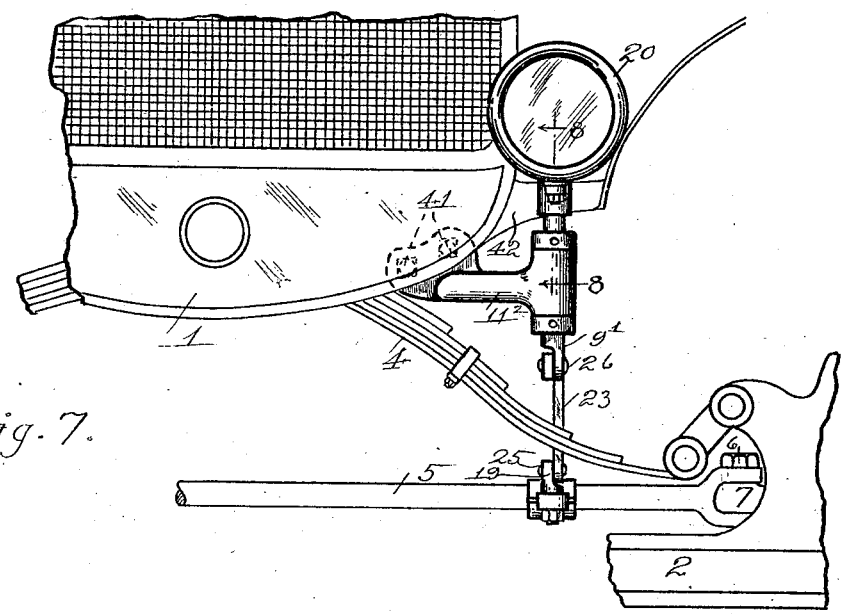
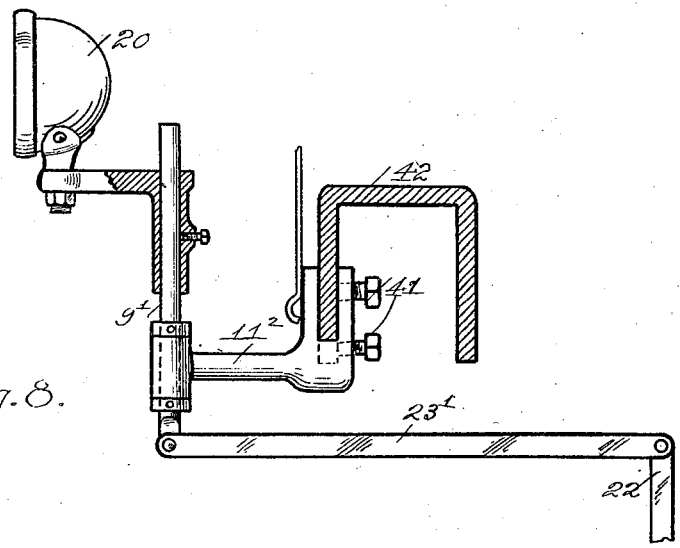

Patented Nov. 8, 1927.

1,648,349

UNITED STATES PATENT OFFICE.

JAMES INGELLS, OF MUSKEGON, MICHIGAN.

DIRIGIBLE HEADLIGHT.

Application filed July 22, 1926. Serial No. 124,244.

The present invention relates to dirigible headlights for vehicles (such as automobiles) and its object is to provide an improved device of that character operated by the steering means of the vehicle; and more particularly, to provide improved lamp-turning connections between the steering means and the headlight, allowing flexing of the springs whereby the vehicle body is supported on its axle.

This and any other objects hereinafter appearing are attained by, and the invention finds preferable embodiment in, the structure hereinafter particularly described in the body of this specification and illustrated by the accompanying drawings, in which:—

Figure 1 is a view in perspective of a portion of the front of an automobile, showing the dirigible headlight mechanism applied thereto;

Figure 2 is a top plan view of a part thereof;

Figure 3 is a side view of the operative connections between an element of the automobile's steering means and the headlight, certain parts being shown in section;

Figure 4 shows a modified construction of the device in plan view;

Figure 5 is a front view of a spring whereby the vehicle body is supported on its axle, a portion of said modified construction being shown in section taken on line 5—5 of Figure 4;

Figure 6 is a side view of the operative connections between an element of the automobile's steering means and the headlight, certain parts being sectioned on line 6—6 of Figure 5;

Figure 7 is a front view of another modified construction of the device shown mounted on an automobile; and Figure 8 is a side view of the operative connections, in said second modified construction, between an element of the automobile's steering means and the headlight, certain parts being shown in section taken on line 8—8 of Figure 7.

In the accompanying drawings my dirigible headlight mechanism is shown applied to a vehicle, the automobile designated generally 1, having the front axle 2 and front wheels 3, the body of the automobile being supported on the axle by the spring 4. The automobile has steering means of usual type, including the element or bar 5 horizontally movable by a hand-turned steering wheel through the usual connecting parts, not shown. The ends of this element or bar 5 are pivotally connected at 6 to the arms 7 of the steering knuckles.

In the construction illustrated in Figures 1, 2 and 3 a member—the vertical rock shaft 9—is carried by the vehicle's body swingably in a horizontal plane, rocking in the axially vertical bearing 10 in a bracket 11 bolted at 12 to the automobile's frame. This rock shaft is, in said construction, formed in two sections 13, 14 rigidly connected by a front plate 15 bored at 14$^a$ to receive the threaded lower end of said upper section which is the supporting post of the headlight 20, said post being secured by the nut 16. By this construction, the lamps or headlights furnished with certain automobiles may be applied to my mechanism without alteration.

The bar or member 5 carries an arm 17 secured thereto by a split clamp whose sides are drawn together on the bar by a screw bolt 18. This arm carries a member 19 swingable thereon in a horizontal plane, having a downward extension 21 turnable on a vertical axis in said arm 17. A pair of links 22, 23 are pivotally connected at 24 adjacent one of their ends, swingably in a vertical plane. The other ends of these links are pivotally connected at 25 and 26 to the members 19 and 9 respectively, swingably in a vertical plane.

It will be seen that the movement of the steering element 5 to the right hand side of the automobile will swing the headlight toward the automobile's left hand side and vice versa; and that, by reason of the pivots 21, 24, 25 and 26 such movement is free and untrammelled; and that by reason of the pivots 24, 25 and 26 the flexing of the automobile's spring 4 will not interfere with the operation of the headlight-swinging mechanism.

In the modified construction illustrated In Figures 4, 5 and 6, the bracket 11$^1$ is secured by its clamp portion 40 on the automobile's front spring 4; while in the second modified construction illustrated in Figures 7 and 8, the bracket 11$^2$ is bolted at 41 to the bolster 42 supported by the vehicle spring 4.

In the views showing the first and second modified constructions, parts similar to those illustrated in Figures 1, 2 and 3 are identified by the same reference numerals with the prime mark added.

The invention being intended to be pointed out in the claim, is not to be limited to or by details of construction of the particular embodiment thereof illustrated by the drawings or hereinbefore described.

I claim:

In combination with a vehicle having a horizontally movable steering element, a device of the character described comprising: a member carried by the vehicle swingably in a horizontal plane and comprising aligned separate sections; a lamp carried by the upper section of said member; links connected at one of their ends swingably in a vertical plane and connected at their other ends to said element and to said member respectively swingably in a vertical plane, a plate rigidly connected to said sections and extending laterally toward the sides of the vehicle to conceal the joint between said sections.

In testimony whereof I have hereunto set my hand at Grand Rapids, Michigan, this 19th day of July, 1926.

JAMES INGELLS.